Sept. 2, 1958 J. H. VOGELSONG 2,850,703

NONLINEAR TERMINATIONS FOR DELAY LINES

Filed Feb. 25, 1955

INVENTOR
J. H. VOGELSONG
BY Jaurson Falk
ATTORNEY

1

2,850,703

NONLINEAR TERMINATIONS FOR DELAY LINES

James H. Vogelsong, Madison, N. J., assignor to Bell Telephone Laboratories, Incorporated, New York, N. Y., a corporation of New York Application February 25, 1955, Serial No. 490,475

1 Claim. (Cl. 333—31)

This invention relates to terminating arrangements for signal transmission networks and more particularly to nonlinear termination circuits in electrical delay line networks for minimizing undesirable reflections arising from loads having nonlinear impedance characteristics.

In many types of pulse information processing systems, such as computers, radar, telephone systems, and the like, the problem of reflected pulses due to a mismatch of impedances on a line can be quite serious. In addition to the power loss normally associated therewith, such reflections can give rise to false operation of the equipment and thereby produce erroneous results.

One of the most commonly utilized components in such types of information processing systems is the electrical delay line which often is employed to equalize delays through various signal paths and align in time corresponding signals. Delay lines also are used, in computing systems in particular, as low capacity, rapid access memories. The problem of unwanted reflections on delay lines from impedance mismatches frequently is aggravated in these and other computer applications by the nonlinear impedance characteristics of the logic and amplifier circuits into which the delay line often works. As the impedance of such terminating circuits is not constant and frequently is affected by the amplitude of the pulse being processed by the delay line, the problem of avoiding reflections due to an impedance mismatch has proved to be a difficult one.

One approach to this problem is described in a copending application of Q. W. Simkins, Serial No. 490,474, filed February 25, 1955, now Patent 2,763,841 granted September 18, 1956, which discloses a nonlinear terminating arrangement for delay lines in which the delay line is deliberately under terminated for practically all of the input pulse interval. As explained more fully below, this results in pulses of one polarity only being reflected back to the input end of the line where they are absorbed by a properly poled unidirectional impedance match connected to the input terminals.

An arrangement such as that described in the above-mentioned Simkins application advantageously may be employed in those types of information processing systems wherein the reflection of a reflected pulse back to the output end of the delay line would result in erroneous operation. It is still further advantageous, however, from the standpoint of required pulse energy, to reduce as much as possible all reflected pulses, including the single polarity reflected pulses present in the aforementioned Simkins application.

It is a general object of this invention to provide an improved circuit for suppressing unwanted reflections generated by an impedance mismatch of a delay line.

More specifically, it is an object of this invention to provide an improved termination circuit in an electrical delay line for suppressing, with a reduced amount of required pulse energy, unwanted reflections arising from a nonlinear load.

It is a further object of this invention to provide a nonlinear terminating circuit for a pulsed electrical delay line which matches the characteristic impedance of the line for substantially the entire pulse interval.

These and other objects of the invention are attained in one specific embodiment of the invention in which a resistance element in series with a unilateral impedance is connected to the output terminals of a delay line whereby the delay line is under terminated only during the short time intervals associated with the rise and fall of the input pulse and is properly matched during the remainder of the pulse interval.

An examination of the nature of the reflections generated by an impedance mismatch shows that the coefficient or reflection $\Gamma_L$ may be expressed as:

$$\Gamma_L=\frac{Z_L-Z_O}{Z_L+Z_O} \qquad (1)$$

where $X_L$=terminating impedance and
$Z_O$=characteristic impedance of the line.

From Equation 1 it can be seen that for resistive impedances for all frequencies involved:

(1) No reflections occur when $R_L=R_O$, that is, when the impedances are matched;
(2) Positive reflections occur when $R_L>R_O$, that is, when the line is over terminated; and
(3) Negative reflections occur when $R_L<R_O$, that is, when the line is under terminated.

Positive reflections mean that the polarity of the reflected pulse is the same as the polarity of the incident pulse. Conversely, negative reflections mean that the polarity of the reflected pulse is the opposite of that of the incident pulse. The character of the nonlinear load into which the delay line must work in any of its applications, as described above, is such that its impedance will vary above and below the characteristic impedance of the delay line and thus produce both positive and negative reflections.

In accordance with an aspect of this invention, a resistance element in series with a normally nonconducting unilateral impedance element, such as a diode, is connected to the output terminals of the delay line in parallel with the load. The diode is biased so that the pulse voltage at which the diode becomes conducting divided by the pulse current at this time is equal to the delay line characteristic resistance. The delay line is under terminated for all values of pulse voltage below the bias potential of the diode. When the pulse voltage reaches the point where the diode begins to conduct, the resistance element connected in series with the diode effectively is placed in parallel with the load across the output terminals of the line. The resistance element is chosen so the resistance of this parallel combination matches the characteristic resistance of the delay line. As this condition prevails for practically the entire pulse period, the invention provides almost complete freedom from unwanted pulse reflections. The delay line is misterminated during only the short time intervals associated with the rise and fall of the pulse, i. e., when the pulse voltage is less than the bias voltage. Some energy is reflected back over the line during these intervals, but it is in the form of short spikes rather than as a pulse persisting for the full pulse interval. For this reason, much of this reflected energy is concentrated in the high frequency portion of the spectrum and therefore is greatly attenuated by the delay line.

It is a feature of this invention that an electrical delay line having a load with nonlinear impedance characteristics be terminated with its characteristic resistance for substantially the entire interval of the input signal pulse.

It is a further feature of this invention that a resistance in series with a unilateral impedance element be connected to an electrical delay line in circuit with a nonlinear impedance load wherein the conduction of the unilateral impedance element causes the delay line load impedance to be equal to the characteristic resistance of the line.

These and other desirable features of this invention may be completely understood from the following detailed description, together with the accompanying drawing, in which.

Figures 1, 2, 3, 4:
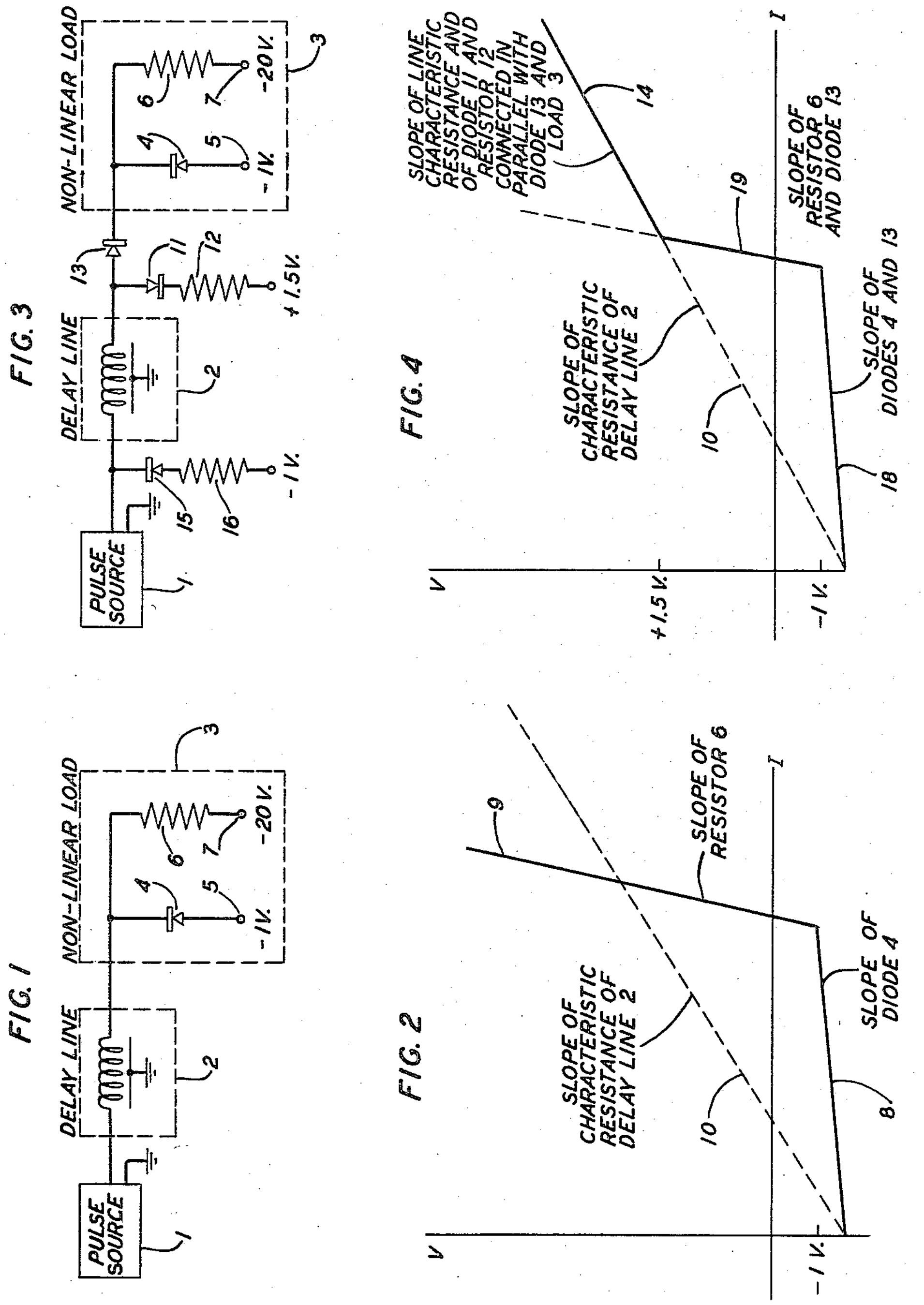
Fig. 1 is a partially schematic diagram of a delay line network terminated by a load having nonlinear impedance characteristics in accordance with the prior art.
Fig. 2 is a graph showing the voltage current characteristics of the nonlinear load impedance of Fig. 1.
Fig. 3 is a schematic diagram of a delay line network having a nonlinear termination arrangement in accordance with an embodiment of the instant invention.
Fig. 4 is a graph showing the voltage current characteristic of the nonlinear termination arrangement of Fig. 3.

Turning now to the drawing, the delay line network shown in Fig. 1 comprises a pulse source 1, which may be any one of a number of circuit components utilized in information processing systems, a delay line 2, the input terminal of which is connected to the pulse source 1, and a nonlinear load impedance 3 connected to the output terminal of the delay line 2. The load impedance 3 comprises a diode 4, poled so as to be in the forward direction for negative pulses, and a resistance 6. A source of bias potential 5, which advantageously may be minus one volt, is connected to the diode 4 whereby the diode changes its state from a low impedance to a high impedance condition when the top of the input signal pulse becomes more positive than this value. This value of bias potential, like those of the other potentials disclosed in this specification is dependent upon the amplitude of the applied input pulse and is intended merely to be exemplary. The resistance 6 is connected to a source of potential 7, which advantageously may be minus twenty volts in this specific circuit. The load impedance 3 is the schematic equivalent of the type of nonlinear terminating impedance into which the delay line will work in pulse information systems as described above may comprise germanium diode and transistor logic and amplifier circuits employing a large number of component elements.

The V—I characteristic of the load impedance 3 is shown in Fig. 2 of the drawing. The effective resistance which this impedance presents to the delay line is the pulse voltage divided by the pulse current. As can be seen from the graph, the load resistance is essentially the low forward resistance of the diode 4, shown by curve 8, until the pulse becomes more positive than minus one volt, at which point the diode is back biased and the incremental load resistance becomes essentially that of the resistor 6, as shown by curve 9. The characteristic resistance of the delay line 2 which, disregarding end effects due to reactive components, can be assumed to be constant is shown by curve 10. Thus, it can be seen that the terminating resistance is dependent upon the amplitude of the input pulse and varies above and below the characteristic impedance of the line. For small currents the line is under terminated; for currents above a predetermined value the line is over terminated. Both positive and negative reflections therefore may be sent back to the input end of the line where, if another mistermination exists, further reflections may be created to travel back to the line output and give rise to false operation.

In accordance with an aspect of this invention, further nonlinear impedance means are connected in circuit with the load impedance to enable the line to be matched for substantially all of the input pulse interval. This is accomplished, in the embodiment depicted in Fig. 3, by the circuit comprising the pulse source 1 connected to the input terminal of the delay line 2 and to an electrode of diode 15, shown poled in the forward direction for negative pulses. The other electrode of diode 15 is connected through a resistance element 16 to a source of bias potential which advantageously may be minus one volt in this specific embodiment. The output terminal of delay line 2 is connected to an electrode of diode 11, shown poled in the forward direction for positive pulses and an electrode of the isolating diode 13, also shown poled in the forward direction for positive pulses. The other electrode of diode 11 is connected through a resistance element 12 to a source of positive bias potential, which advantageously may be one and one-half volts. The remaining electrode of the isolating diode 13 is connected to the load impedance 3, described above.

In the circuit of Fig. 3 reflections due to a mismatch between the line and the nonlinear load are eliminated, in accordance with this invention, for practically the entire pulse interval as can be seen from the V—I characteristic of Fig. 4. Positive going input pulses from the pulse source 1 travel down the delay line 2 to diode 11 and through isolating diode 13 to the load impedance 3. Since the diode 11 is held in a nonconducting condition by the positive one and one-half bias source when the input pulse is more negative than this value, only the low forward resistances of diodes 13 and 4 effectively comprise the load until the pulse top reaches a value minus one volt, as shown by curve 18 of Fig. 4. When the pulse amplitude passes this point, diode 4 is backbiased to a nonconducting condition and, as diode 11 remains nonconducting, only the resistance of the load resistor 6 plus the low forward resistance of diode 13 comprises the delay line load, as shown by curve 19. As the input pulse rises and becomes more positive than plus one and one-half volts, diode 11 switches from the nonconductive to the conductive state, thereby effectively placing resistance 12 in parallel with the load impedance 3.

In accordance with an aspect of this invention, the value of resistance 12 is such that the over-all resistance of the combination of diode 11 and resistance 12 connected in parallel with diode 13 and the load 3 matches the characteristic resistance of the delay line 2. This is shown by curve 14 in Fig. 4 of the drawing. Thus, it is clear that after the input pulse becomes more positive than the bias potential of diode 11, the delay line is terminated by its characteristic impedance and no reflections exist on the line.

Only during the rise and fall of the input pulse, when the pulse amplitude is less than the bias potential of diode 11, is there a mismatch. In the instant illustrative example, the delay line is under terminated during these short time intervals and energy will be reflected back on the line in the form of short negative spikes. Much of this energy is concentrated in the high frequency end of the spectrum and therefore will be attenuated by the line. The remainder advantageously may be absorbed by a properly poled unidirectional impedance match, such as diode 15 and resistor 16 shown in Fig. 4, as further discussed in the above-mentioned Simkins application, connected to the pulse source 1 which presents a high impedance to the line during the off-pulse interval.

It is to be understood that the circuits discussed above are merely illustrative of the application of the principles of the invention. By proper polarization of the diodes and selection of the biasing potentials, a termination circuit for negative input pulses may be constructed. Numerous other terminating arrangements may be devised by those skilled in the art without departing from the spirit and scope of the invention.

What is claimed is:

In an electrical circuit, an electrical signal delay line of predetermined characteristic impedance having an input and output terminal, an electrical signal pulse source connected to said input terminal, nonlinear load means including a load resistance of value higher than said characteristic impedance and a first diode connected in parallel with said load resistance, a second diode connected in opposition to said first diode between said output terminal and said nonlinear load means, a first terminating means for said delay line including a third diode connected to said input terminal, a first source of bias potential, and a first resistance of matching value to said characteristic impedance interconnecting said first source of bias potential and said third diode, said third diode being polarized to conduct in response to a pulse potential at said input terminal equal to or less than said first bias potential, and a second terminating means for said delay line including a fourth diode connected to said output terminal, a second source of bias potential of opposite polarity to said first source of bias potential, and a second resistance of matching value to said characteristic impedance interconnecting said second source of bias potential and said fourth diode, said fourth diode being polarized to conduct in response to a pulse potential at said output terminal equal to or greater than said second source of bias potential.

References Cited in the file of this patent

UNITED STATES PATENTS

| | | |
|---|---|---|
| 2,194,180 | Sabloniere | Mar. 19, 1940 |
| 2,480,195 | Posthumus | Aug. 30, 1949 |
| 2,727,143 | Slutz | Dec. 13, 1955 |
| 2,763,841 | Simkins | Sept. 18, 1956 |